(12) United States Patent
Arati

(10) Patent No.: US 10,961,906 B2
(45) Date of Patent: Mar. 30, 2021

(54) ARRANGEMENT OF EXCHANGERS FOR MARINIZATION OF A MARINE ENGINE

(71) Applicant: NANNI INDUSTRIES, La Teste de Buch (FR)

(72) Inventor: Jacques Arati, Gujan Mestras (FR)

(73) Assignee: NANNI INDUSTRIES, La Teste de Buch (FR)

(*) Notice: Subject to any disclaimer, the term of this patent is extended or adjusted under 35 U.S.C. 154(b) by 854 days.

(21) Appl. No.: 15/174,298

(22) Filed: Jun. 6, 2016

(65) Prior Publication Data
US 2017/0314460 A1    Nov. 2, 2017

(30) Foreign Application Priority Data

Apr. 28, 2016  (FR) ..................................... 16 53806

(51) Int. Cl.
   *F01P 7/14* (2006.01)
   *F02B 61/04* (2006.01)
   (Continued)

(52) U.S. Cl.
   CPC .............. *F02B 61/04* (2013.01); *F01P 3/207* (2013.01); *F01P 11/04* (2013.01);
   (Continued)

(58) Field of Classification Search
   CPC ...... F02B 61/04; F02B 29/0406; F02B 75/20; F02B 75/22; F02B 2075/1824;
   (Continued)

(56) References Cited

U.S. PATENT DOCUMENTS 3,125,081 A  *  3/1964  Jasper ....................... F01P 7/14
                                                              123/41.09
4,878,864 A  *  11/1989 Van Bentem .......... B63H 20/08
                                                                440/5
(Continued)

FOREIGN PATENT DOCUMENTS

| JP | H0717919 | * | 3/1995 | ............... F01M 5/00 |
| JP | 2002317632 | * | 10/2002 | ........... Y02T 10/146 |
| KE | WO2014050723 | * | 4/2014 | ............. F01P 11/04 |

*Primary Examiner* — Hung Q Nguyen
*Assistant Examiner* — Anthony Donald Taylor, Jr.
(74) *Attorney, Agent, or Firm* — Nixon & Vanderhye

(57) ABSTRACT

An arrangement of exchangers for marinization of a marine engine, including an engine block with in-line cylinders or cylinders in a V, cooled by a cooling fluid, at least one turbocompressor with a hot chamber connected to an outlet and a cold chamber connected to the cylinders of the engine block, a reverser including a housing and containing oil, wherein the arrangement includes:
   a radiator hose for supplying cooling water,
   a turbocompressor exchanger,
   an engine exchanger,
   a reverser exchanger,
   a radiator hose for discharging cooling water toward an outlet of combustion gases, downstream from the hot chamber of the at least one turbocompressor,
with these three exchangers being placed in this order and inserted in the circulation direction of the water between the radiator hose for supplying the cooling water and the radiator hose for discharging this same cooling water.

7 Claims, 7 Drawing Sheets

(51) Int. Cl.
  *F01P 3/20* (2006.01)
  *F01P 11/04* (2006.01)
  *F02B 29/04* (2006.01)
  *F02B 75/20* (2006.01)
  *F02B 75/22* (2006.01)
  *F02B 75/18* (2006.01)

(52) U.S. Cl.
  CPC .......... *F02B 29/0406* (2013.01); *F02B 75/20* (2013.01); *F02B 75/22* (2013.01); *F01P 2050/04* (2013.01); *F01P 2050/06* (2013.01); *F01P 2060/02* (2013.01); *F01P 2060/045* (2013.01); *F01P 2060/12* (2013.01); *F02B 2075/1824* (2013.01); *Y02T 10/12* (2013.01)

(58) Field of Classification Search
  CPC ........ F01P 3/207; F01P 11/04; F01P 2050/04; F01P 2050/06; F01P 2060/02; F01P 2060/045; F01P 2060/12; Y02T 10/146
  USPC ...................................................... 123/41.01
  See application file for complete search history.

(56) References Cited

U.S. PATENT DOCUMENTS

| | | | |
|---|---|---|---|
| 9,228,479 B2 * | 1/2016 | Bunn ................... | B63H 21/383 |
| 2006/0096555 A1 * | 5/2006 | Buck ....................... | F01P 3/207 |
| | | | 123/41.28 |
| 2011/0308486 A1 * | 12/2011 | Dorothy ................. | F02B 75/20 |
| | | | 123/41.74 |

* cited by examiner

ARRANGEMENT OF EXCHANGERS FOR MARINIZATION OF A MARINE ENGINE

FIELD OF THE INVENTION

This invention relates to an arrangement of exchangers for marinization of a marine engine, in particular the exchanger of the cooling liquid, the exchanger of the intake air of the turbocompressor, and the oil exchanger of the reverser.

BACKGROUND OF THE INVENTION

Marine power engines, namely internal combustion engines operating on diesel fuel and producing several hundred horsepower, are used on working craft, service vessels, fishing vessels, or else pleasure vessels. Such engines come, for the most part, from makers of ground vehicle engines, be they vehicles intended for road transport, construction machines, or else farm machinery.

To produce an engine base, the costs are extremely high because these engines are increasingly sophisticated, increasingly precise during their operation with, in particular, management of temperatures that are located in specific ranges.

In addition, reliability is increasingly important, and it is necessary for this purpose that all of the operating aspects are perfectly controlled.

These engine bases should be compatible with the maximum number of vehicles, engines, or machines to ensure the amortization of research efforts and manufacturing resources.

During operation, these engines should be cooled to discharge a residual portion of the calories generated by the operation, and a cooling liquid circulates in the engine block for this purpose.

This cooling liquid circulates through a cooling exchanger for its own cooling. In the case of ground machines, this exchanger is a water/air exchanger.

As for power engines, they are systematically equipped with turbocompressors that comprise the gases intended to be allowed into the engine using exhaust gases. For this purpose, a hot turbine is driven by the exhaust gases in a first chamber, and a cold turbine integral with the same shaft is driven in rotation in a cold chamber.

The exhaust gases are discharged at the outlet of the hot chamber toward the exhaust line, and the compressed gases are injected into the cylinders of the engine with the fuel mixture.

The problem is that a compressed gas heats up, or, to achieve the best operation with an internal combustion engine, it is necessary to use compressed gases but it is also necessary to cool them before mixing with the fuel to improve the yield. An exchanger is therefore inserted at the outlet of the cold chamber of the turbocompressor to cool the compressed air before its transfer toward the engine.

This exchanger is of the air/air type in ground vehicle engines.

In ground engines, the engines are coupled to manual or automatic transmissions whose operations and arrangements are complex and numerous. The oil from these transmissions is optionally cooled by an independent oil/air exchanger.

In marine engines, the arrangements of the cooling elements are necessarily different since it is impossible to provide air cooling. The cooling fluid is fresh water or sea water.

SUMMARY OF THE INVENTION

Marinization consists in proposing exchangers that make it possible to operate the engine with high reliability, on the one hand, a greater longevity, on the other hand, with the performance being all the more difficult when it is a matter of highly corrosive sea water. The advantage is to have a cooling fluid with a high coolant coefficient.

In contrast, these marine engine arrangements are difficult to implement because these engines are placed at the bottom of the hull and in spaces that are generally tight, and even very tight.

The compactness is therefore a very significant parameter in the field of marine exchangers so as not to add to the bulkiness of the engine.

On the one hand, it is necessary to be able to install the engine but also to remove it from the bottom of the hold where the access passages are limited in size. In addition, once installed, the more compact the arrangement, the more the available space on the periphery for maintenance and/or repair operations is increased, and this may prove very useful.

This gain in compactness needs to preserve the ability to change the engine.

Another special feature of the marine engines is that these engines are coupled to a stepping reverser, also making it possible to rotate the propeller but in the opposite direction so as to initiate a reverse.

Such a reverser is immersed in a housing and is bathed in oil; during operation, this oil heats up, and it is important also to cool it.

Likewise, the turbocompressor of the engines to be marinized is to be combined with an exchanger so as to cool the air admitted into the engine. It is understood that, in the case of a marine engine, the exchanger of the air/water type is much more fragile than an air/air exchanger. It is important to have a very high reliability so that water does not penetrate the intake air circuit that is likely to lead to an engine failure. Engine breakdown on the water is always a major problem, much more so than on land, and very quickly creates a hazardous situation.

For the purposes of increasing reliability and decreasing bulkiness, it is also important to limit the adjacent elements such as radiator hoses, clamps, rings, and other connecting plates. These elements are either causes of poor reliability or sources of weight and cost. It is therefore necessary to refine the arrangement, and this is precisely a significant characteristic of the arrangement according to this invention, an arrangement that combines compactness, reliability by eliminating sources of defects, and optimization of the cooling circuit chain.

BRIEF DESCRIPTION OF THE DRAWINGS

This invention is now described relative to the accompanying drawings, drawings that show an embodiment with a variant, the figures of these drawings showing respectively.

DETAILED DESCRIPTION OF THE INVENTION

Figure 1:
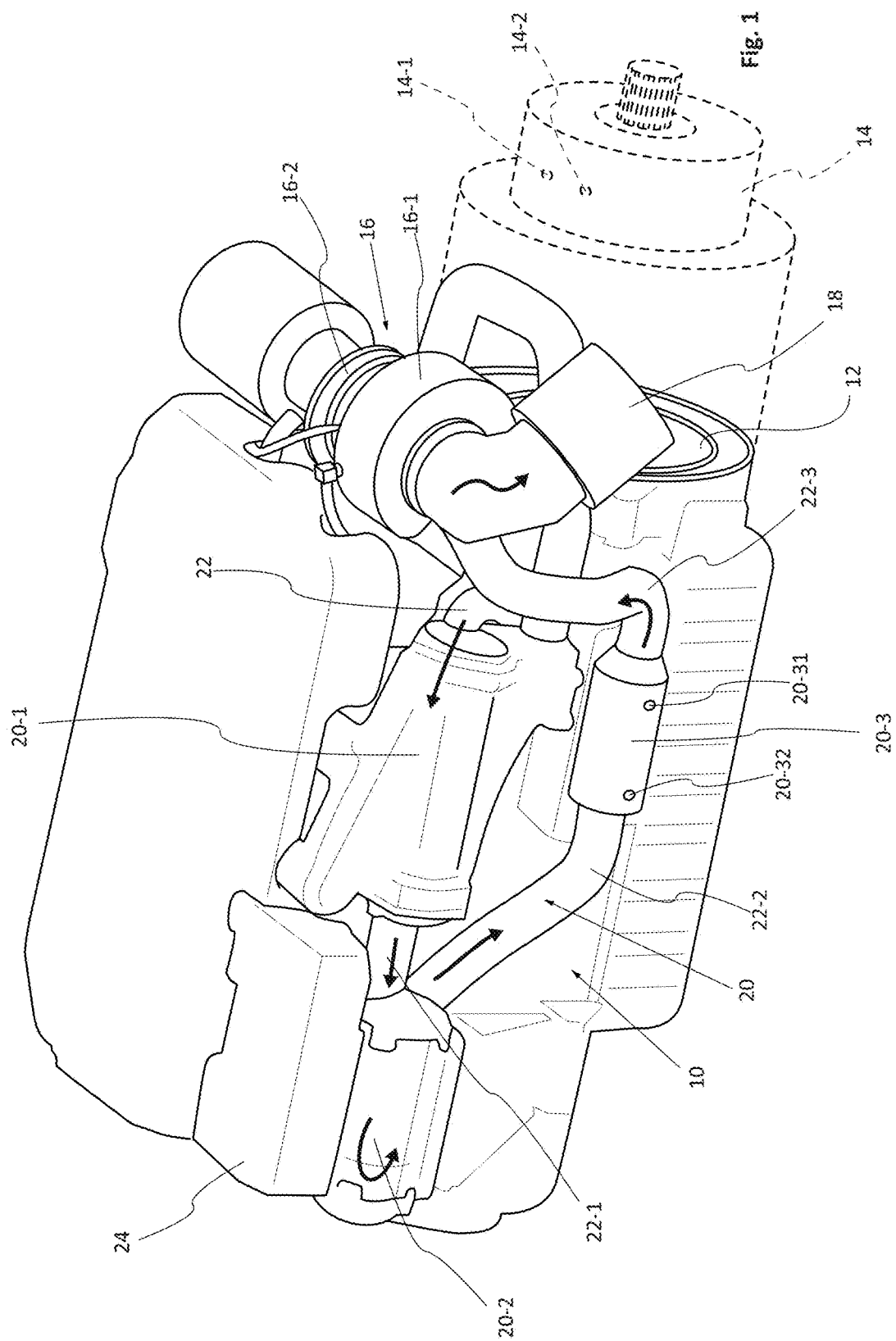
FIG. 1: a perspective view of the arrangement according to this invention of an in-line 6-cylinder engine with its exchanger circuit.
Figure 2:
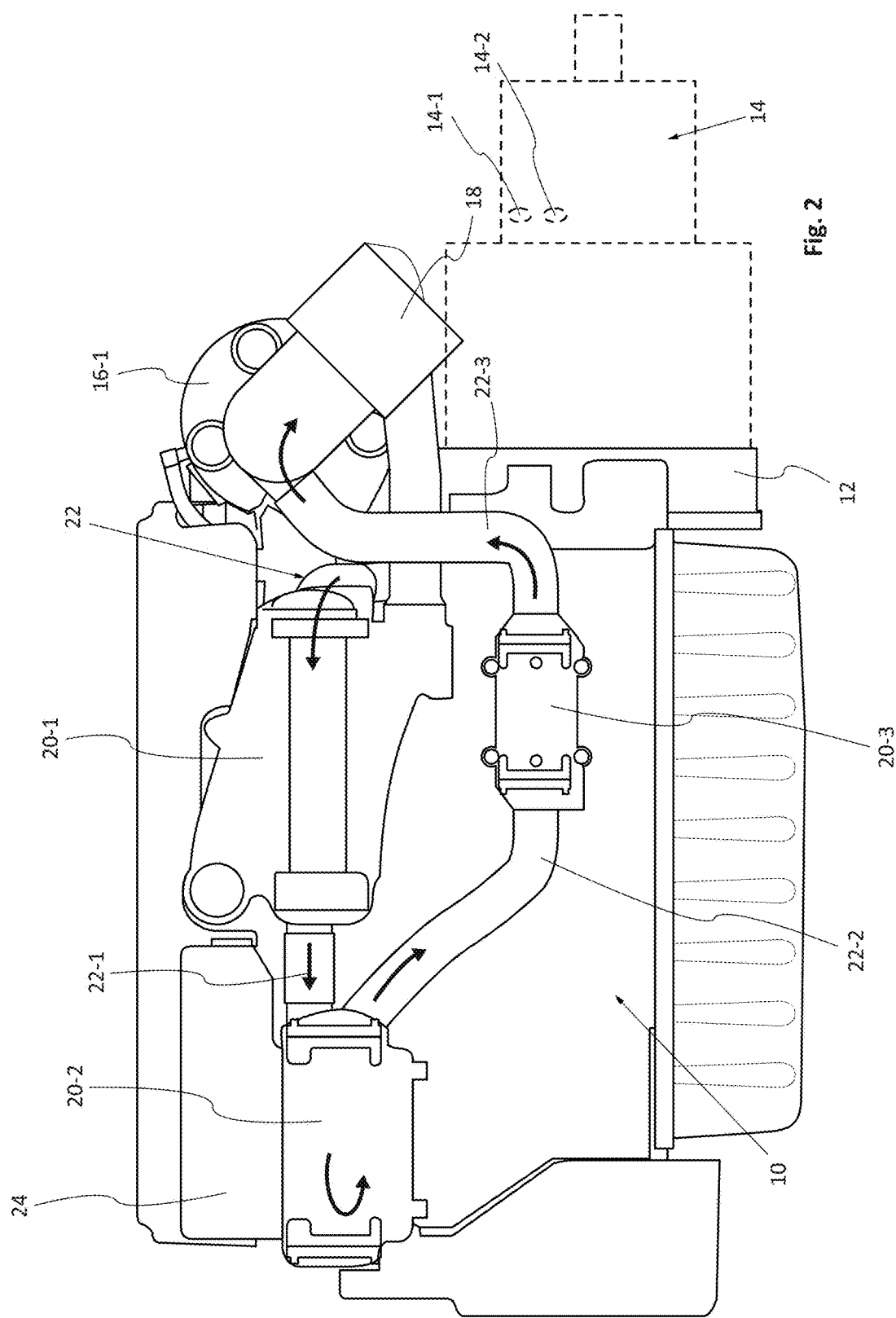
FIG. 2: a lateral elevation view of the arrangement of FIG. 1, on which the exchanger circuit according to this invention is shown in solid lines.
Figure 3:
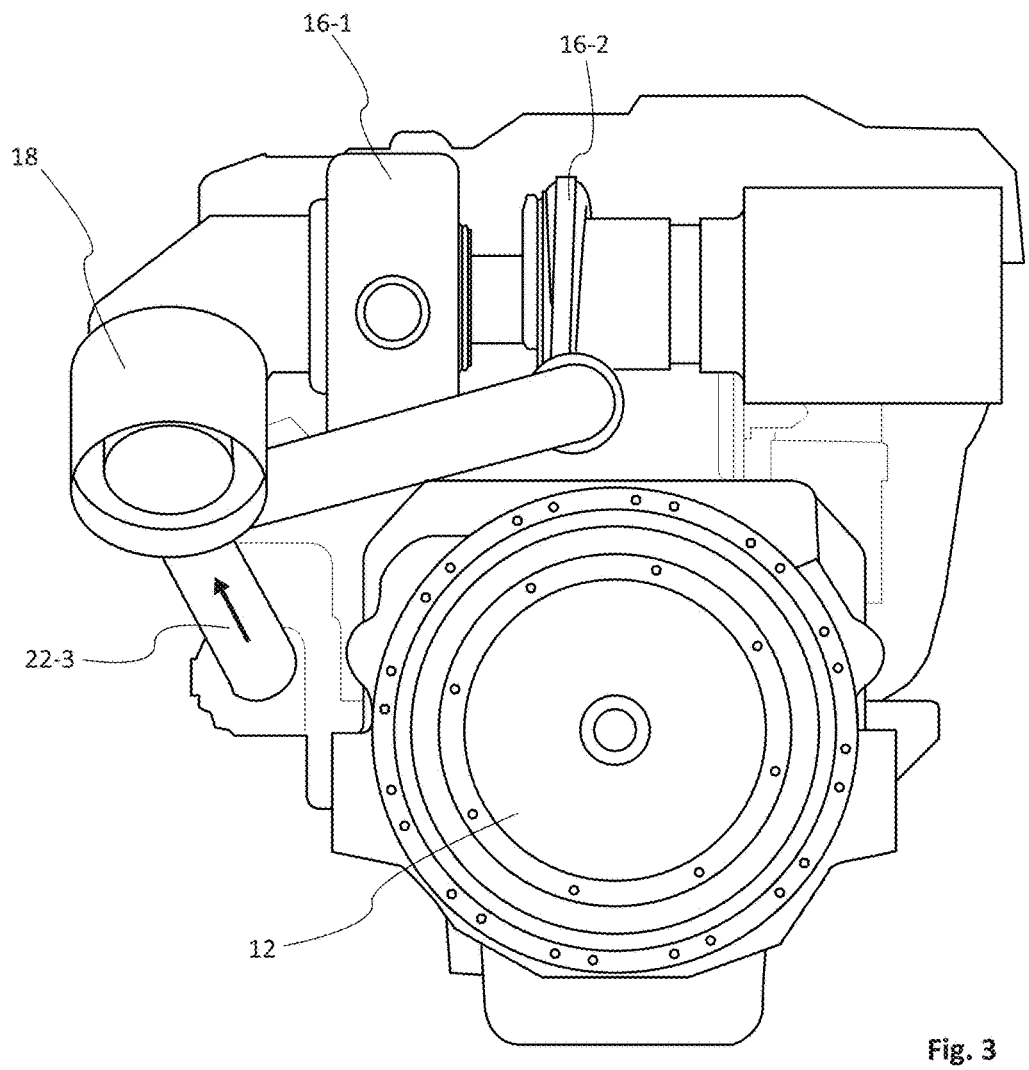
FIG. 3: a view from the rear of the arrangement of FIG. 1, FIG. 4: a perspective view, from the left front, of an arrangement of a variant arrangement of the exchanger circuit in the case of a V8 engine.
Figure 4:
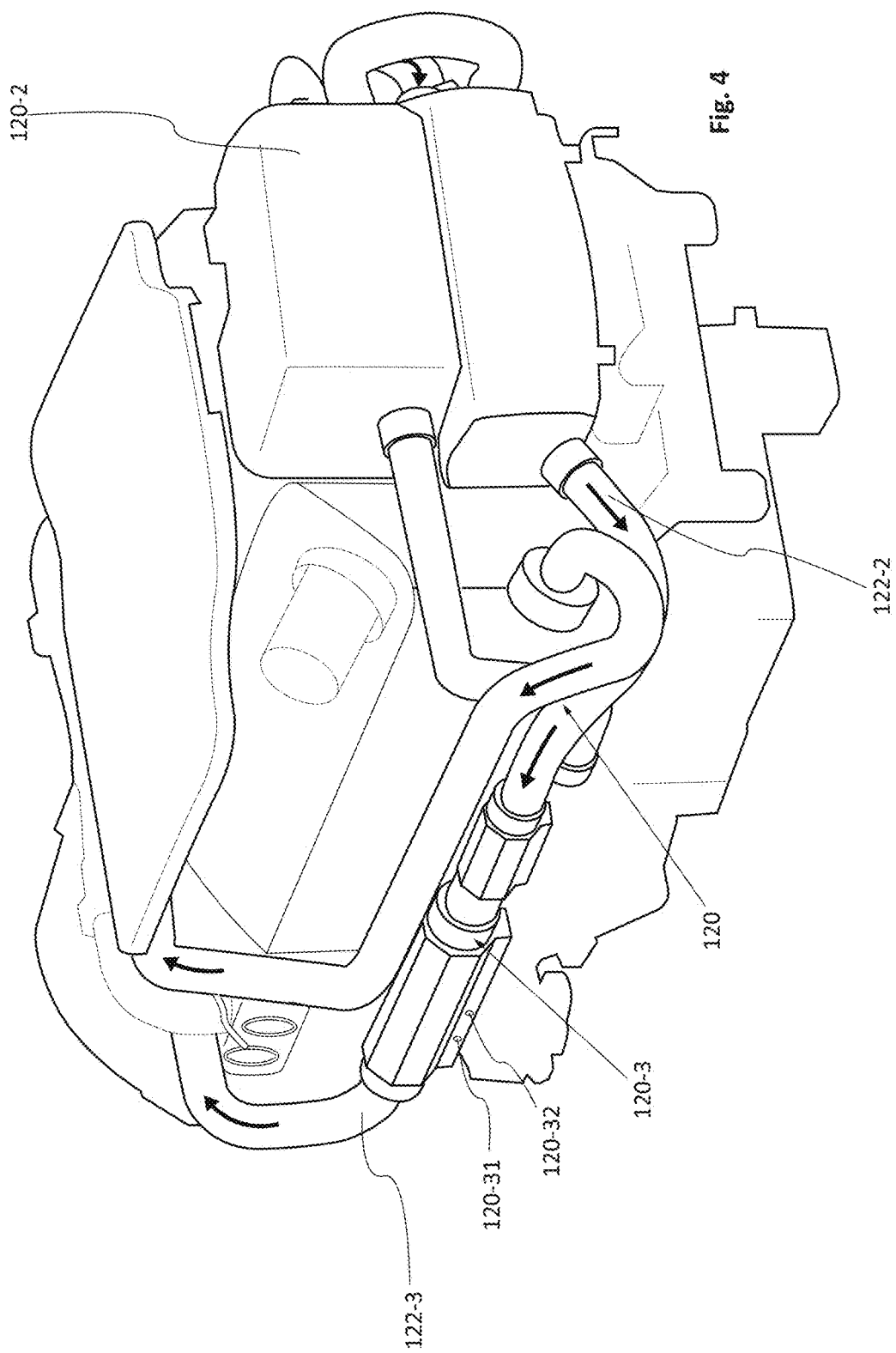
Figure 5:
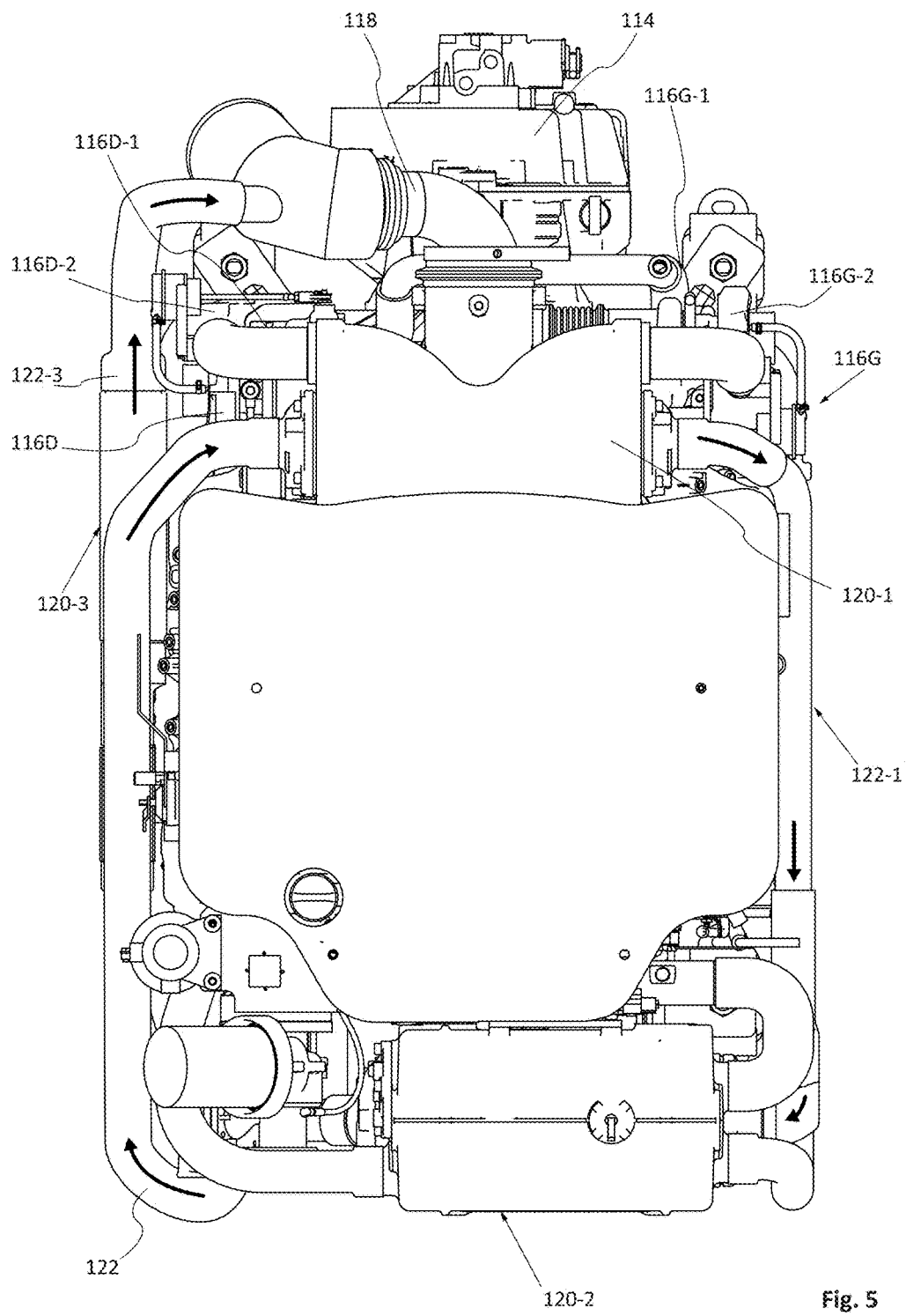
FIG. 5: a top view of the arrangement of FIG. 4, FIG. 6: a left lateral elevation view of the arrangement of FIG. 4, FIG. 7: a right lateral elevation view of the arrangement of FIG. 4.
Figure 6:
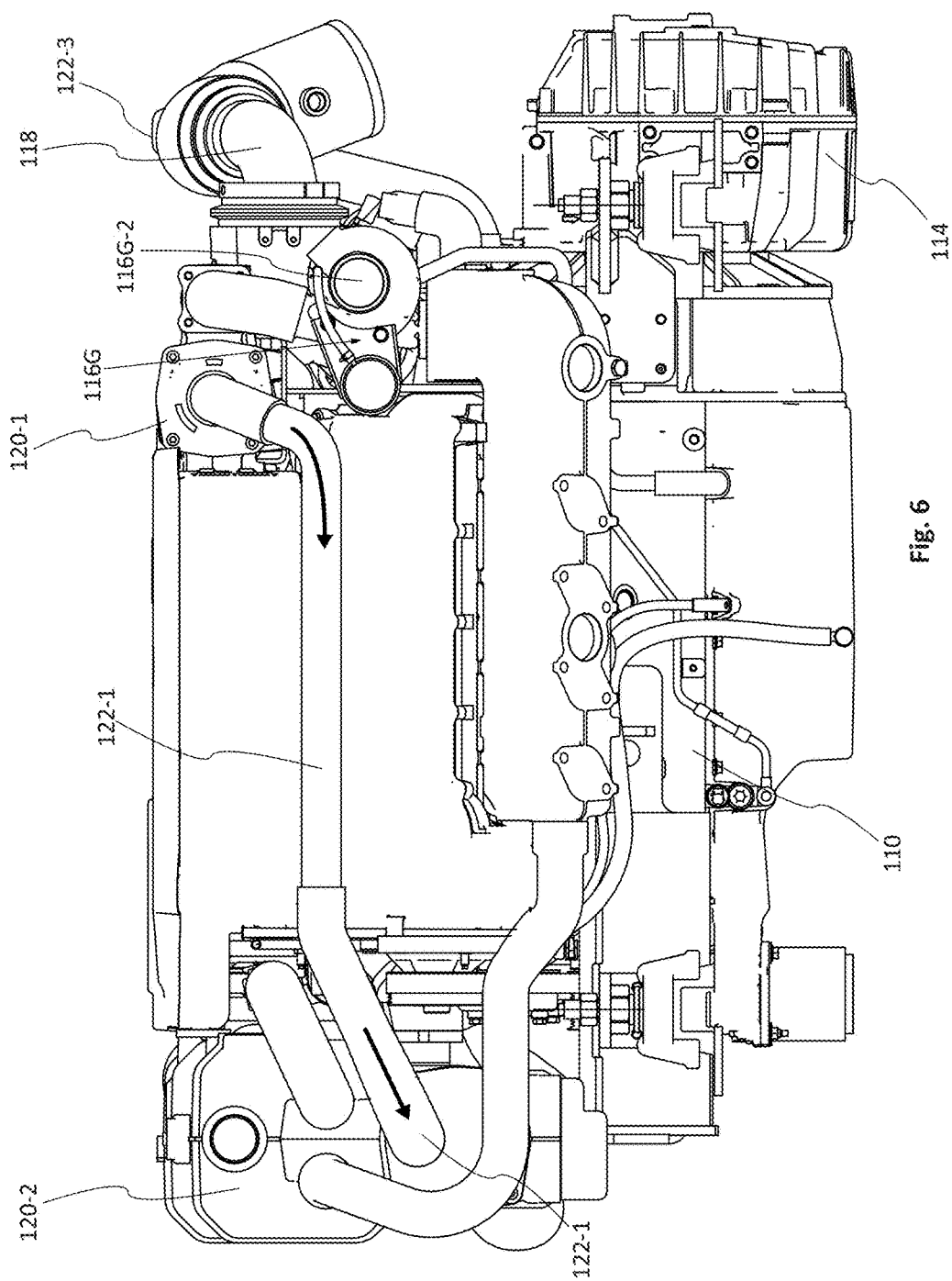
Figure 7:
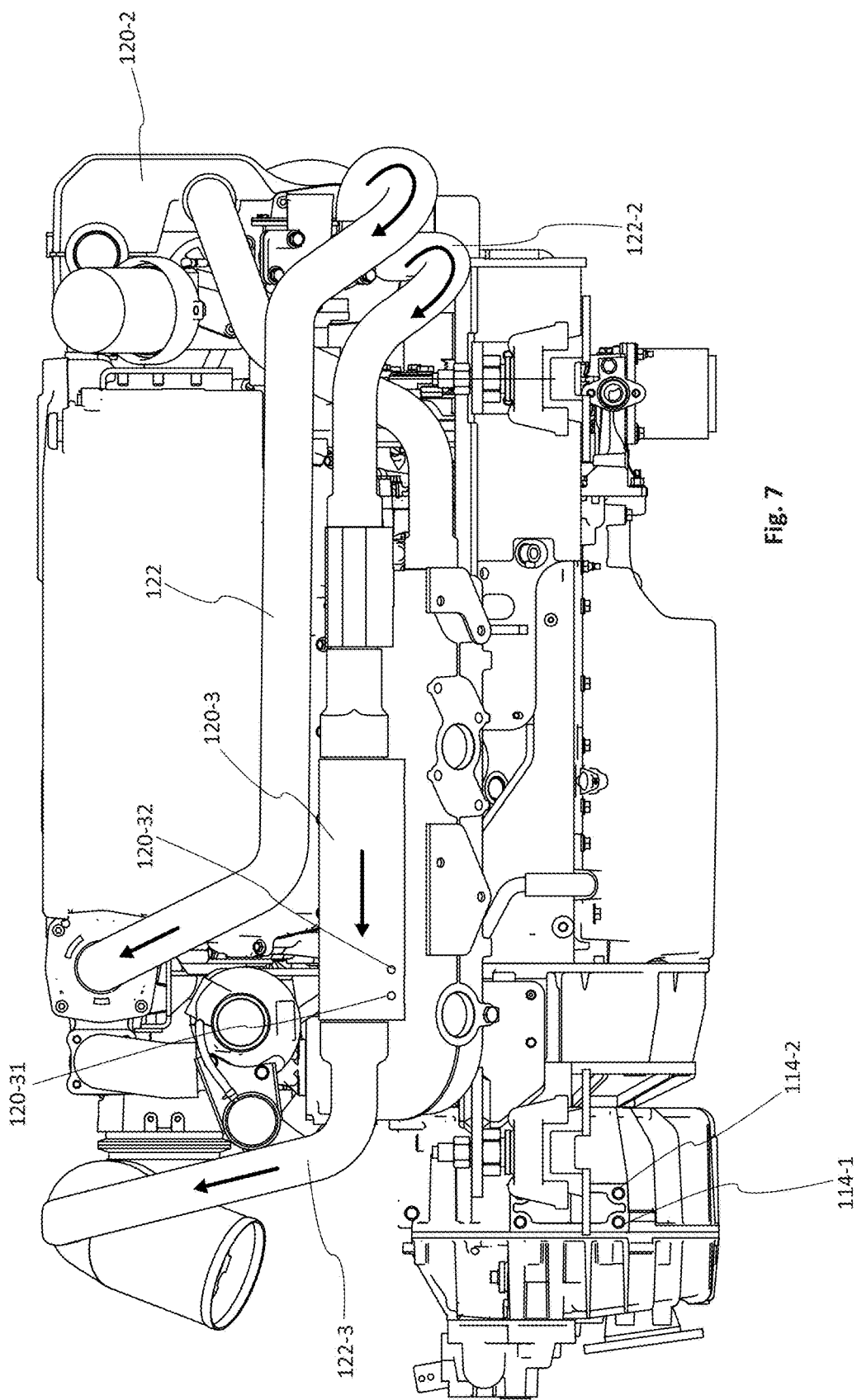

An internal combustion engine, in this case an in-line 6-cylinder engine, is shown in FIGS. 1, 2, and 3.

Only the essential elements of the engine that are necessary to the description of the invention are described; the peripherals and the internal elements are not shown because this invention does not deal with them.

In a general way, this engine comprises an engine block 10 with an outlet 12 toward propulsion means such as a shaft line, not shown but completely familiar to one skilled in the art.

A reverser 14 is combined with this outlet 12, upstream from the propulsion means.

The engine block 10 also supports at least one turbocompressor 16, the only one in the engine in question of FIGS. 1, 2, and 3. In a completely familiar way, this turbocompressor 16 comprises a hot chamber 16-1 and a cold chamber 16-2.

Finally, the engine comprises an outlet 18 of the combustion gases of the hot chamber 16-1 of the turbocompressor 16 toward an exhaust line.

In this invention, a line 20 of exchangers comprising:
a turbocompressor exchanger 20-1,
an engine exchanger 20-2,
a reverser exchanger 20-3
is provided.

The general characteristic of the arrangement of the line 20 relates to these three exchangers that are arranged in this order, the one that corresponds—as will now be explained—to the circulation of the coolant, in this case, fresh water or salt water.

In addition and also in a completely familiar way, the engine comprises a water pump that pumps outside, fresh or salt, cooling water ER, using completely familiar sampling means comprising an airtight passage through the hull to house a water intake, a strainer for filtering the pumped water.

The water thus pumped exits from the water pump via a radiator hose 22 first of all to pass through the first exchanger, namely the turbocompressor exchanger 20-1.

This turbocompressor exchanger 20-1 is a gaseous fluid/liquid fluid exchanger, comprising a housing in which the compressed air circulates. The cooling water ER circulates in tubes that pass through said housing. The compressed air that exits from the cold chamber 16-2, notwithstanding with too high a temperature, circulates in the housing, and this exchange makes it possible to pass the calories from the air into the cooling water ER.

With the specific heat of the water being much higher than that of air, the temperature of the cooling water ER increases in temperature but in a very limited way from 3 to 4° C. to provide an estimate.

The air of the turbocompressor exchanger 20-1 itself passes from a temperature of 215° C. to a temperature of 44° C., to provide an order of magnitude.

The cooling water ER exits through a radiator hose 22-1 of the turbocompressor exchanger 20-1 and penetrates into the engine exchanger 20-2.

Such an engine exchanger 20-2 is of the liquid fluid/liquid fluid type and in particular is described in detail, according to an advantageous embodiment in the European Patent Application EP 2 009 259, in the name of the same applicant. The transfer effectiveness is excellent.

This exchanger also comprises tubes in which the cooling fluid FR from the engine exiting from the circulation channels within the engine block 10 circulates, with the cooling fluid FR from the engine being in a closed circuit, this in a known way.

An expansion reservoir 24 is inserted into the closed circuit and is readily visible in FIG. 1.

The cooling water ER of the engine that is much colder than the cooling fluid FR is charged with calories extracted from said cooling fluid.

In the exchanger described in the European Patent Application EP 2 009 259, the compactness of said exchanger with a U-shaped and counterflow circulation makes possible an excellent exchange, and it is noted that it is housed with an extremely small profile shift in relation to the engine block 10 and under the expansion reservoir.

It is also noted that the radiator hose 22-1 is extremely short, and the two turbocompressor exchangers and engine are aligned, which prevents pressure drops, the degradations linked to the additional radiator hose length, and additional attachments.

The positioning of the engine exchanger at this location and on the same side as the turbocompressor exchanger also limits this radiator hose length.

In the case where the engine exchanger is of the U-shaped circulation type, it is noted that said exchanger also makes it possible to send the cooling water ER from the front of the engine block 10 toward the rear in this case.

The cooling water ER, based on the operating speed of the engine and numerous parameters such as the initial temperature of the cooling water, the circulation flow rate, and the temperature in the engine compartment, can see its temperature rise by about 10 degrees.

The cooling water ER exits from the engine exchanger 20-2 through a radiator hose 22-2 to enter into the oil exchanger 20-3 of the reverser. It is again noted that the radiator hose length is short, and the radiator hose does not have an elbow or any other angle likely to create the pressure drop.

This oil exchanger 20-3 comprises a housing with an inlet 20-31 and an outlet 20-32, and the reverser 14 itself comprises an inlet 14-1 and an outlet 14-2.

The outlet 14-2 is connected by a first hydraulic hose, of the common type, at the inlet 20-31 of the oil exchanger 20-3, and the outlet 20-32 is connected by a second hydraulic hose at the inlet 14-1 of the reverser.

Thus, the oil exits from the reverser, enters into the oil exchanger 20-3, circulates in a circulation tube within the housing of the exchanger, and cools by exchange with the cooling water ER that circulates in the housing.

This exchanger is a liquid fluid/liquid fluid exchanger, of which one of the liquid fluids is oil so that the exchange is excellent.

The calories of the oil that is to be discharged are limited because the heating is itself limited so that even if the differential between the temperature of the cooling water ER and the temperature of the oil is smaller because of the rise in temperature of the cooling water, the exchange is to a large extent sufficient to cool the temperature of the oil upon demand of the controls of the engine.

The cooling water ER exits through the radiator hose 22-3 of the reverser exchanger 20-3 to enter into the outlet 18 of the combustion gases, downstream from the hot chamber 16-1 of the turbocompressor. Again, this radiator hose is of reduced length.

The water mixes with the combustion gases, also ensuring their cooling before passing into the exhaust line and external disposal.

A significant compactness of the exchanger line 20 according to this invention, very limited radiator hose lengths, and an alignment of these radiator hoses are noted.

The exchanger line 20, in the case of an in-line engine, is thus integrally on the same side of the engine block 10. It is noted that the exchanger line 20 is arranged in a spiral in a vertical plane.

The absence of modifications in the positionings of the elements of the engine block aside from marinization is also noted, with the exchanger line being supported by feet and integrated within these peripheral elements making the arrangement particularly compact.

The invention is now described in relation to another type of engine in which the cylinders are in the shape of a V, in this case a V8.

The corresponding exchanger line also comprises an identical order of three exchangers, with the references relating to this type of V engine having references identical to the references of the engine with in-line cylinders but increased by 100:
 a turbocompressor exchanger 120-1
 an engine exchanger 120-2
 a reverser exchanger 120-3.

The 8 cylinders are thus distributed 4 cylinders per side, this in a completely familiar way.

In a general way, this V engine comprises an engine block 110 with an outlet 112 toward propulsion means such as a shaft line, not shown, but completely familiar to one skilled in the art.

A reverser 114 is combined with this outlet 112, upstream from the propulsion means.

The engine block 110 also supports two turbocompressors 116D and 116G, right and left, in the engine in question and shown in FIGS. 4 to 7. These two turbocompressors are placed behind the engine.

These turbocompressors 116D and 116G each comprise, in a completely familiar way, a hot chamber 116D-1, 116G-1 and a cold chamber 116D-2, 116G-2.

The engine comprises a single and common outlet 118 of combustion gases, from the hot chambers 116D-1, 116G-1 of the turbocompressors 116 and 117 toward an exhaust line.

The turbocompressor exchanger 120-1 of the two turbocompressors 116D and 116G is a common exchanger.

This turbocompressor exchanger 120-1 is advantageously placed through the engine, with the two inlets of the two turbocompressors being joined in the median plane of the engine.

This turbocompressor exchanger 120-1 is placed immediately above the engine block, to the right at the top of the cylinders, in the V freed up by the cylinders, not generating any volume projecting beyond said engine block and its operating elements.

A water pump ensures the pumping of the cooling water ER, fresh water or salt water, and puts it into circulation through a radiator hose 122. This radiator hose 122 empties into the turbocompressor exchanger 120-1 though a right end and exits via the left end through a radiator hose 122-1.

The radiator hose 122-1 extends toward the front of the engine to attach to the engine exchanger 120-2. This engine exchanger 120-2 is placed at the top of the engine, in place of the necessary engine cooling means on the ground vehicles, in particular the cooling fans.

The bulkiness generated by this exchanger does not exceed the general bulkiness of the engine block and its operating elements.

The engine exchanger 120-2 can advantageously be of the same type as the exchanger 20-2 and the exchanger described in the European patent application EP 2 009 259.

The cooling fluid FR of the engine exiting from the circulation channels within the engine block 110, with this cooling fluid FR of the engine being in a closed circuit, circulates in tubes being bathed in the cooling water ER in circulation.

It is noted that in this case of a V engine, a tandem of superposed compact exchangers of the type of those of the patent mentioned above is provided.

The cooling water ER exits from the engine exchanger 120-2 through a radiator hose 122-2 for entering into the reverser exchanger 120-3. It is again noted that the radiator hose length is short, and the radiator hose does not have an elbow and another angle likely to create the pressure drop.

This reverser exchanger 120-3 comprises a housing with an inlet 120-31 and an outlet 120-32, and the reverser 114 itself comprises an inlet 114-1 and an outlet 114-2.

The outlet 114-2 is connected by a first hydraulic hose, of the common type, at the inlet 120-31 of the reverser exchanger 120-3, and the outlet 120-32 is connected by a second hydraulic hose at the inlet 114-1 of the reverser.

Thus, the oil exits from the reverser 114, enters into the reverser exchanger 120-3, circulates in a circulation tube within the housing of the reverser exchanger 114 and cools by exchange with the cooling water ER that circulates in the housing.

This exchanger is a liquid fluid/liquid fluid exchanger, of which one of the liquid fluids is oil so that the exchange is excellent.

It is noted that this radiator hose 122-2 is short between the engine exchanger 120-2 and the reverser exchanger 120-3.

The cooling water ER exits through the radiator hose 122-3 of the reverser exchanger 120-3 to enter into the outlet 118 of the combustion gases, common to the two rows of cylinders, downstream from the hot chambers 116G-1 and 116D-1 of the turbocompressor. Again, it is noted that this radiator hose is of a reduced length.

The cooling water ER mixes with the combustion gases, also ensuring their cooling before passing into the exhaust line and external disposal.

A significant compactness of the exchanger line 120 according to this invention, very limited radiator hose lengths, and an alignment of these radiator hoses are noted.

It is noted that the exchanger line 120 is placed in a horizontal spiral.

The exchanger line 120, in the case of a V engine, also remains very compact because the three exchangers are located in spaces left free between the mating elements of the engine block and/or freed up by the V geometry of said engine block.

Two of the coolers, those of the turbocompressors and engine, are common to the two rows of cylinders, which are particularly homogeneous and compact while allowing total accessibility.

This invention thus proposes an arrangement of a highly compact exchanger line, adaptable to different in-line or V engine geometries, and this ensures great ease of maneuvering of said engine block both during the positioning through the bridge and in the case of removal and also ensures very great accessibility for in-place engine maintenance operations.

The invention claimed is:

1. An arrangement of exchangers for marinization of a marine engine that has an engine block with cylinders arranged in-line along a longitudinal length of the engine block that extends between opposing front and rear ends of the engine block, with heads of said cylinders arranged along a top of the engine block, the top of the engine block delimited by two opposing longitudinal sides of the engine block, the cylinders cooled by a first cooling fluid, a turbocompressor that includes a hot chamber connected to an exhaust outlet for allowing combustion gases to exit the marine engine and a cold chamber connected to the cylinders of the engine block, and a reverser that includes a reverser housing and contains oil, the arrangement comprising:
   a first radiator hose for supplying a second cooling fluid;
   a turbocompressor exchanger;
   an engine exchanger;
   a reverser exchanger; and
   a second radiator hose that discharges the second cooling fluid toward the exhaust outlet, downstream from the hot chamber of the turbocompressor,
   the turbocompressor, engine, and reverser exchangers being placed in an order of the turbocompressor exchanger, then the engine exchanger, and then the reverser exchanger, and arranged in a direction of circulation of the second cooling fluid between the first radiator hose for supplying the second cooling fluid and the second radiator hose for discharging the second cooling fluid,
   wherein the turbocompressor exchanger, engine exchanger, and reverser exchanger are arranged as an exchanger line that is located entirely on one of the opposing longitudinal sides of the engine block.

2. The arrangement of exchangers according to claim 1, wherein the exchanger line is arranged as a spiral that extends laterally from a vertical and longitudinal plane.

3. The arrangement of exchangers according to claim 1, wherein in addition to the first radiator hose for supplying the second cooling fluid and the second radiator hose for discharging the second cooling fluid toward the exhaust outlet, the arrangement further comprises a third radiator hose between the turbocompressor exchanger and the engine exchanger, and a fourth radiator hose between the engine exchanger and the reverser exchanger.

4. The arrangement of exchangers according to claim 1, further comprising:
   hydraulic hoses for connection to hydraulic interfaces of the reverser exchanger.

5. The arrangement of exchangers according to claim 2, wherein in addition to the first radiator hose for supplying the second cooling fluid and the second radiator hose for discharging the second cooling fluid toward the exhaust outlet, the arrangement further comprises a third radiator hose between the turbocompressor exchanger and the engine exchanger, and a fourth radiator hose between the engine exchanger and the reverser exchanger.

6. The arrangement of exchangers according to claim 2, further comprising:
   hydraulic hoses for connection to hydraulic interfaces of the reverser exchanger.

7. The arrangement of exchangers according to claim 6, further comprising:
   hydraulic hoses for connection to hydraulic interfaces of the reverser exchanger.

* * * * *